United States Patent
Yin et al.

(10) Patent No.: US 11,086,536 B2
(45) Date of Patent: Aug. 10, 2021

(54) TECHNIQUES FOR MULTIPLE DIRECTORS CONCURRENTLY SERVICING I/OS DIRECTED TO SAME PHYSICAL STORAGE DEVICES

(71) Applicant: EMC IP Holding Company LLC, Hopkinton, MA (US)

(72) Inventors: Peng Yin, Southborough, MA (US); Kunxiu Gao, Boxborough, MA (US); Jiahui Wang, Framingham, MA (US); Seema G. Pai, Shrewsbury, MA (US); Ningdong Li, Acton, MA (US); Daohong Wang, Newton, MA (US); Stephen Richard Ives, West Boylston, MA (US); Li Lang, West Roxbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 16/048,637

(22) Filed: Jul. 30, 2018

(65) Prior Publication Data
US 2020/0034059 A1    Jan. 30, 2020

(51) Int. Cl.
*G06F 3/06* (2006.01)

(52) U.S. Cl.
CPC .......... *G06F 3/0632* (2013.01); *G06F 3/0604* (2013.01); *G06F 3/0664* (2013.01); *G06F 3/0689* (2013.01)

(58) Field of Classification Search
CPC .... G06F 3/0632; G06F 3/0604; G06F 3/0664; G06F 3/0689; G06F 3/061; G06F 3/0628; G06F 3/0629
See application file for complete search history.

(56) References Cited

U.S. PATENT DOCUMENTS

| | | | |
|---|---|---|---|
| 6,209,059 B1 * | 3/2001 | Ofer | G06F 3/0607 |
| | | | 711/114 |
| 6,457,098 B1 * | 9/2002 | DeKoning | G06F 3/061 |
| | | | 711/114 |

(Continued)

OTHER PUBLICATIONS

DellEMC, "Dell EMC® PowerMax™ Reliability, Availability, and Serviceability Technical White Paper," dell.com, Dell Engineering, May 2018.

*Primary Examiner* — Tracy A Warren
(74) *Attorney, Agent, or Firm* — Muirhead and Saturnelli, LLC

(57) ABSTRACT

Techniques for performing configuration may include: determining an initial distribution of logical devices among disk adapters, wherein the initial distribution assigns each logical device a designated disk adapter as a primary active disk adapter servicing I/Os directed to the logical device, wherein the logical devices have storage provisioned from a RAID group including physical storage devices, wherein the disk adapters concurrently issue I/Os to each of the physical storage devices; detecting a configuration change; and responsive to detecting a configuration change, performing first processing. The first processing may include determining, in accordance with the configuration change, a redistribution of the logical devices among the disk adapters; and draining pending I/Os. The configuration change may include adding or removing a logical device provisioned from the RAID group. Performing a first operation on a storage device of the RAID group may include synchronous draining of I/Os of the storage device.

25 Claims, 10 Drawing Sheets

(56) References Cited

U.S. PATENT DOCUMENTS

| | | | |
|---|---|---|---|
| 6,954,835 B1 | 10/2005 | LeCrone et al. | |
| 6,986,009 B1 | 1/2006 | LeCrone et al. | |
| 7,707,186 B2 | 4/2010 | LeCrone et al. | |
| 7,949,637 B1 | 5/2011 | Burke | |
| 8,639,808 B1 * | 1/2014 | Vemuri | G06F 3/0613 709/221 |
| 8,856,397 B1 | 10/2014 | Marshak et al. | |
| 2005/0172097 A1 * | 8/2005 | Voigt | G06F 3/0613 711/170 |
| 2009/0070541 A1 | 3/2009 | Yochai | |
| 2018/0046381 A1 * | 2/2018 | Fagiano | G06F 3/0608 |

* cited by examiner

| LDEV ID 152 | FBA(F) or CKD (C) 154 | Primary DA (owner) 156 |
|---|---|---|
| 0 | F | DA1 (0) |
| 1 | C | DA1 (0) |
| 2 | F | DA2 (1) |
| 3 | C | DA2 (1) |
| 4 | F | DA1 (0) |
| 5 | C | DA1 (0) |
| 6 | F | DA2 (1) |
| 7 | C | DA2 (1) |
| ... | ... | |
| 24 | F | DA1 (0) |
| 25 | C | DA1 (0) |
| 26 | F | DA2 (1) |
| 27 | F | DA2 (1) |
| 28 | F | DA1 (0) |
| 29 | F | DA1 (0) |
| 30 | F | DA2 (1) |
| ... | ... | |
| 63 | F | DA2 (1) |

FIG. 4

| Type/Attribute 202 | LDEV Count 204 | DA 1 (index 0) 206 | DA 2 (index 1) 208 |
|---|---|---|---|
| FBA | 51 | 25 | 26 |
| CKD | 13 | 7 | 6 |
| Overall | 64 | 32 | 32 |

200

210 — FBA row
212 — CKD row
214 — Overall row

FIG. 5

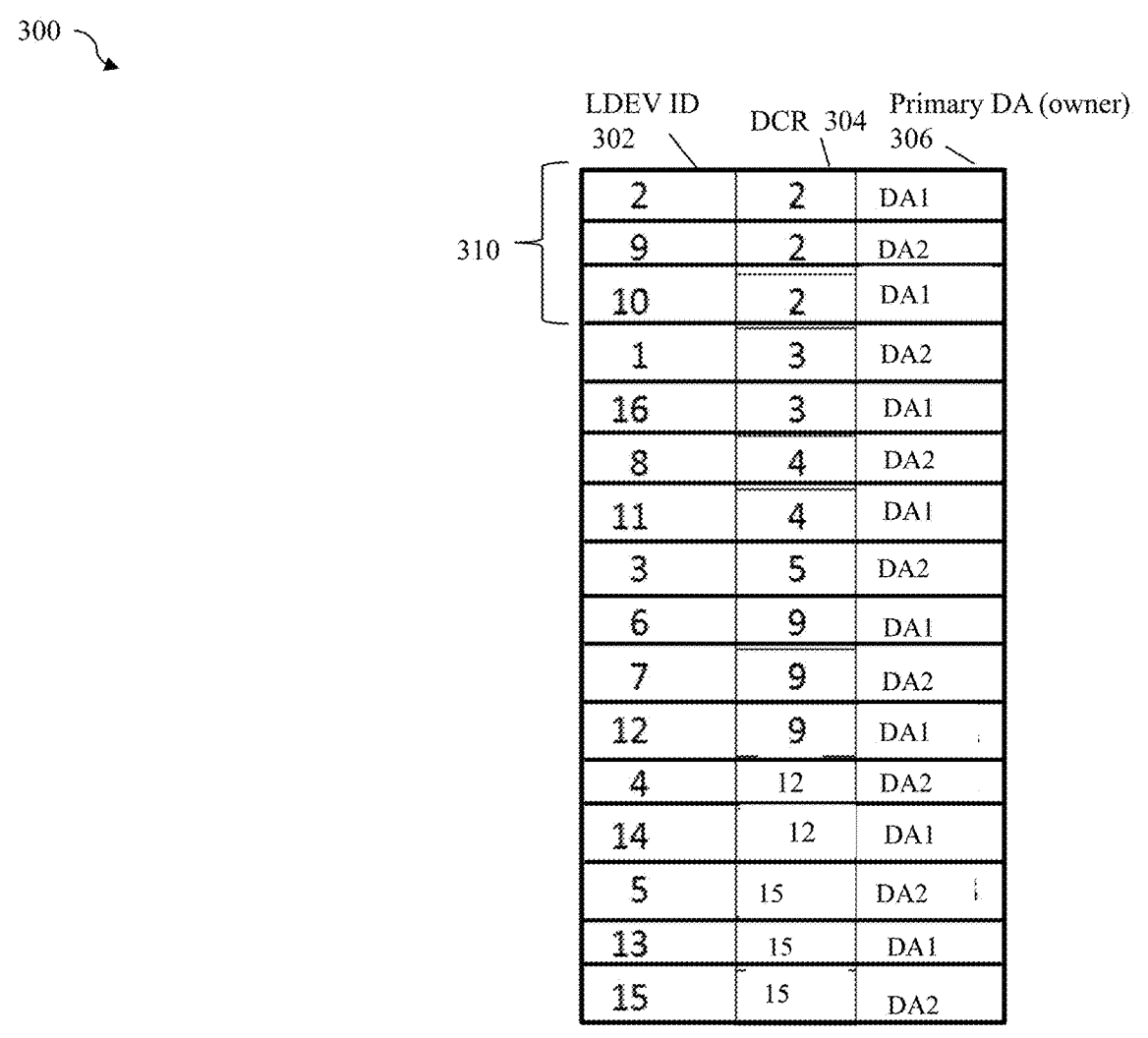

| LDEV ID 302 | DCR 304 | Primary DA (owner) 306 |
|---|---|---|
| 2 | 2 | DA1 |
| 9 | 2 | DA2 |
| 10 | 2 | DA1 |
| 1 | 3 | DA2 |
| 16 | 3 | DA1 |
| 8 | 4 | DA2 |
| 11 | 4 | DA1 |
| 3 | 5 | DA2 |
| 6 | 9 | DA1 |
| 7 | 9 | DA2 |
| 12 | 9 | DA1 |
| 4 | 12 | DA2 |
| 14 | 12 | DA1 |
| 5 | 15 | DA2 |
| 13 | 15 | DA1 |
| 15 | 15 | DA2 |

FIG. 6

TECHNIQUES FOR MULTIPLE DIRECTORS CONCURRENTLY SERVICING I/OS DIRECTED TO SAME PHYSICAL STORAGE DEVICES

BACKGROUND

Technical Field

This application generally relates to data storage.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC™. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of performing configuration comprising: determining an initial distribution of a plurality of logical devices among a plurality of disk adapters, wherein the initial distribution assigns each of the plurality of logical devices a designated one of the plurality of disk adapters as a primary active disk adapter servicing I/Os directed to said each logical device, wherein the plurality of logical devices have storage provisioned from a RAID group comprising a plurality of physical storage devices, wherein the plurality of disk adapters concurrently issue I/Os to each of the plurality of physical storage devices; detecting a configuration change; and responsive to detecting a configuration change, performing first processing comprising: determining, in accordance with the configuration change, a redistribution of the plurality of logical devices among the plurality of disk adapters, wherein the redistribution assigns each of the plurality of logical devices a designated one of the plurality of disk adapters as a primary active disk adapter servicing I/Os directed to said each logical device. The configuration change may include adding new logical device having its storage provisioned from the plurality of physical storage devices of the RAID group, and wherein the redistribution may include assigning a designated one of the plurality of disk adapters as a primary active disk adapter servicing I/Os directed to the new logical device. The configuration change may include deleting one of the plurality of logical devices having its storage provisioned from the plurality of physical storage devices of the RAID group, and wherein the redistribution may include removing a current assignment of a designated one of the plurality of disk adapters as a primary active disk adapter servicing I/Os directed to said one logical device. Each of the plurality of logical devices may have its physical storage provisioned from each of the plurality of physical storage devices of the RAID group. The initial distribution and the redistribution may be performed using a distribution technique that partitions that partitions the plurality of logical devices among the plurality of disk adapters in accordance with one or more balancing criteria. The one or more balancing criteria may include evenly distributing the plurality of logical devices among the plurality of disk adapters. The plurality of logical devices may include a first portion having a first compression rate or ratio and a second portion have a second compression rate or ratio and the one or more balancing criteria may include evenly distributing each of the first portion and the second portion among the plurality of disk adapters. The plurality of logical devices may include a first portion having compression enabled and a second portion having compression disabled and the one or more balancing criteria include evenly distributing each of the first portion and the second portion among the plurality of disk adapters. The plurality of logical devices may include a first portion having a first device type and a second portion having a second device type and the one or more balancing criteria may include evenly distributing each of the first portion and the second portion among the plurality of disk adapters. The plurality of logical devices may include a first portion having a first property or attribute and a second portion having a second property or attribute and the one or more balancing criteria may include evenly distributing each of the first portion and the second portion among the plurality of disk adapters. A first of the plurality of logical devices may be assigned a first of the plurality of disk adapters as the designated one of the plurality of disk adapters that is the primary active disk adapter servicing I/Os directed to said first logical device, and wherein the first processing may include assigning a second of the plurality of disk adapters as the designated one of the plurality of disk adapters that is the primary active disk adapter servicing I/Os directed to said first logical device, wherein, after assigning the second disk adapter, the second disk adapter rather than the first disk adapter services I/Os directed to the first logical device. The first processing may include: draining pending I/Os directed to the first logical device, wherein the pending I/Os are issued and managed by the first disk adapter; and receiving one or more additional I/Os directed to the first logical device, wherein the one or more additional I/Os are issued and managed by the second disk adapter. During the draining, no new I/O operations directed to the first logical device may be sent to the first disk adapter for servicing and all subsequently received I/Os directed to the first logical device may be sent to the second disk adapter. At least a first of the pending I/Os managed by the first disk adapter and a second of the one or more additional I/Os may be concurrent whereby the first disk adapter and the second disk adapter may be concurrently accessing at least one of the plurality of physical storage devices of the RAID group to process the first I/O and the second I/O. The method may include performing a first operation on a first of the physical storage devices of the RAID group requiring synchronous draining of I/Os directed to the first physical storage device. The synchronous draining may include draining pending I/Os from each of the plurality of directors directed to the first physical storage device.

In accordance with another aspect of techniques herein is a system comprising: a processor; and a memory comprising code stored thereon that, when executed, performs a method of performing configuration comprising: determining an initial distribution of a plurality of logical devices among a plurality of disk adapters, wherein the initial distribution assigns each of the plurality of logical devices a designated one of the plurality of disk adapters as a primary active disk adapter servicing I/Os directed to said each logical device, wherein the plurality of logical devices have storage provisioned from a RAID group comprising a plurality of physical storage devices, wherein the plurality of disk adapters concurrently issue I/Os to each of the plurality of physical storage devices; detecting a configuration change; and responsive to detecting a configuration change, performing first processing comprising: determining, in accordance with the configuration change, a redistribution of the plurality of logical devices among the plurality of disk adapters, wherein the redistribution assigns each of the plurality of logical devices a designated one of the plurality of disk adapters as a primary active disk adapter servicing I/Os directed to said each logical device.

In accordance with another aspect of techniques herein is a computer readable medium comprising code stored thereon that, when executed, performs method of performing configuration comprising: determining an initial distribution of a plurality of logical devices among a plurality of disk adapters, wherein the initial distribution assigns each of the plurality of logical devices a designated one of the plurality of disk adapters as a primary active disk adapter servicing I/Os directed to said each logical device, wherein the plurality of logical devices have storage provisioned from a RAID group comprising a plurality of physical storage devices, wherein the plurality of disk adapters concurrently issue I/Os to each of the plurality of physical storage devices; detecting a configuration change; and responsive to detecting a configuration change, performing first processing comprising: determining, in accordance with the configuration change, a redistribution of the plurality of logical devices among the plurality of disk adapters, wherein the redistribution assigns each of the plurality of logical devices a designated one of the plurality of disk adapters as a primary active disk adapter servicing I/Os directed to said each logical device. The configuration change may include adding new logical device having its storage provisioned from the plurality of physical storage devices of the RAID group, and wherein the redistribution may include assigning a designated one of the plurality of disk adapters as a primary active disk adapter servicing I/Os directed to the new logical device. The configuration change may include deleting one of the plurality of logical devices having its storage provisioned from the plurality of physical storage devices of the RAID group, and wherein the redistribution may include removing a current assignment of a designated one of the plurality of disk adapters as a primary active disk adapter servicing I/Os directed to said one logical device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4, 5, and 6 illustrate use of different logical device properties or characteristics used in connection with techniques herein;

DETAILED DESCRIPTION OF EMBODIMENT(S)

Figure 1:
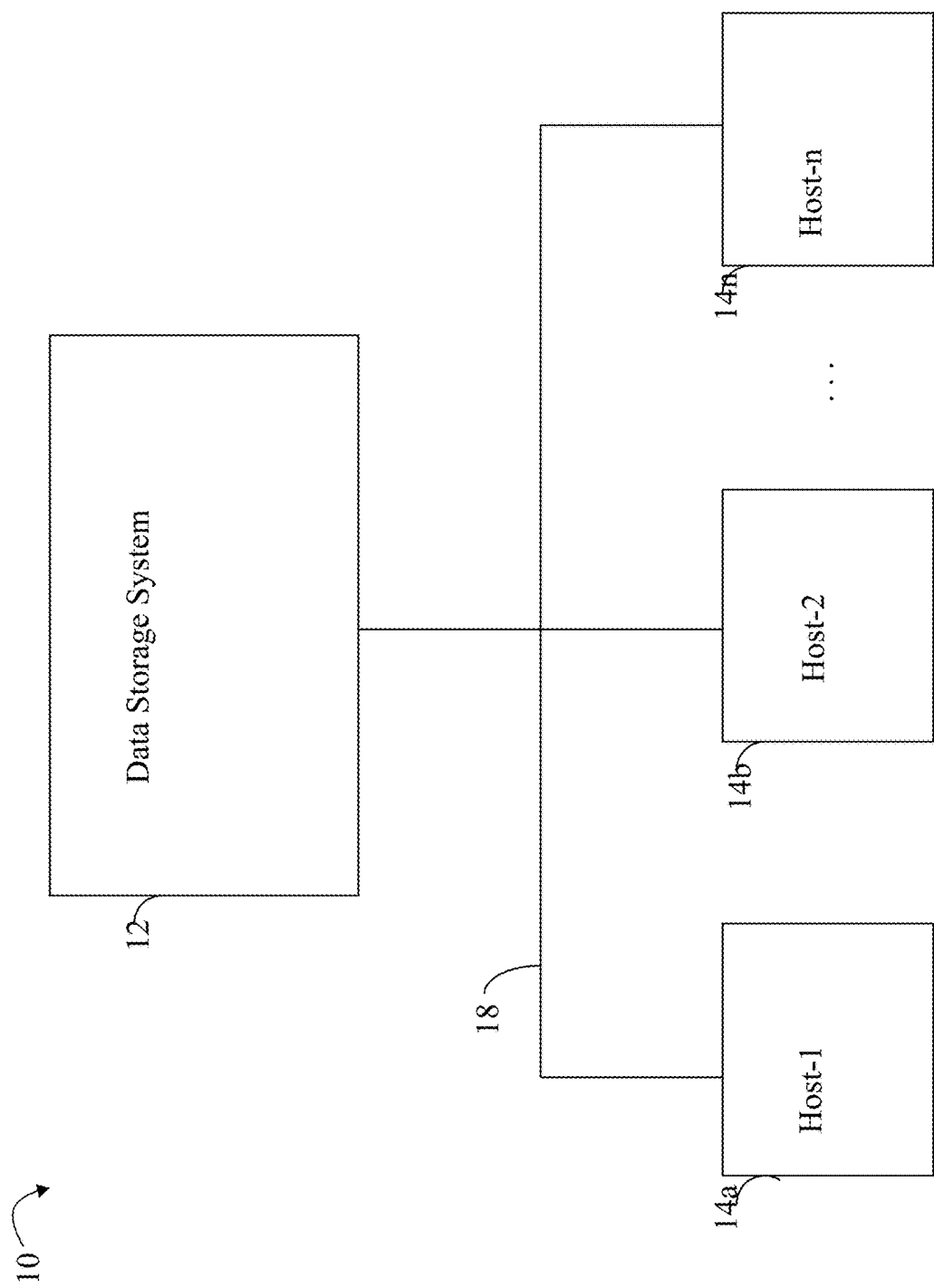
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell EMC™'s Symmetrix® VMAX® data storage system, as well one or more other data storage systems as may vary with the embodiment.

Figure 2A:
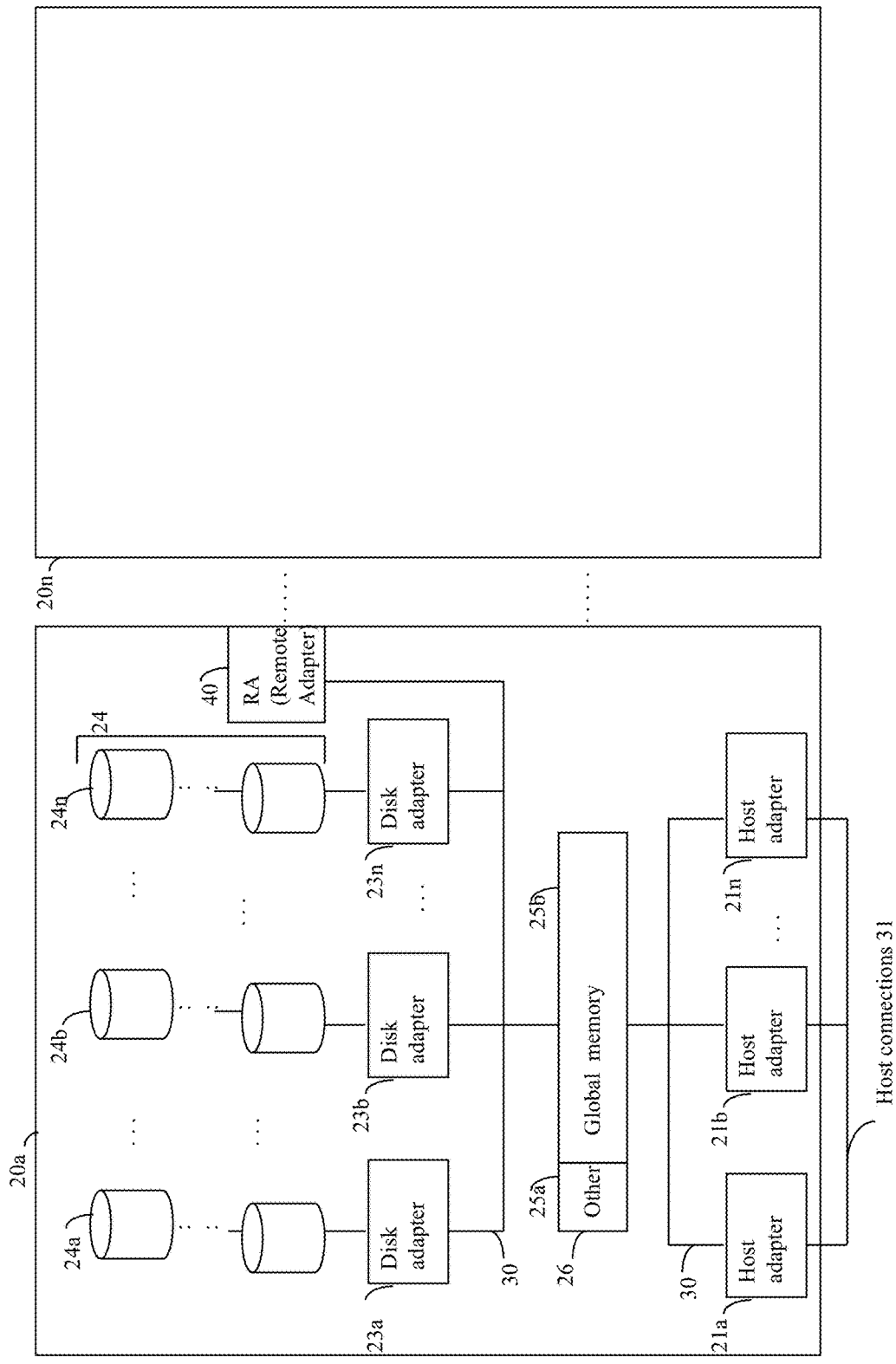
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by Dell EMC™, a backend DA may also be referred to as a disk or physical device controller. The DA may perform operations such as reading data from, and writing data to, the physical storage devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. More generally, a LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
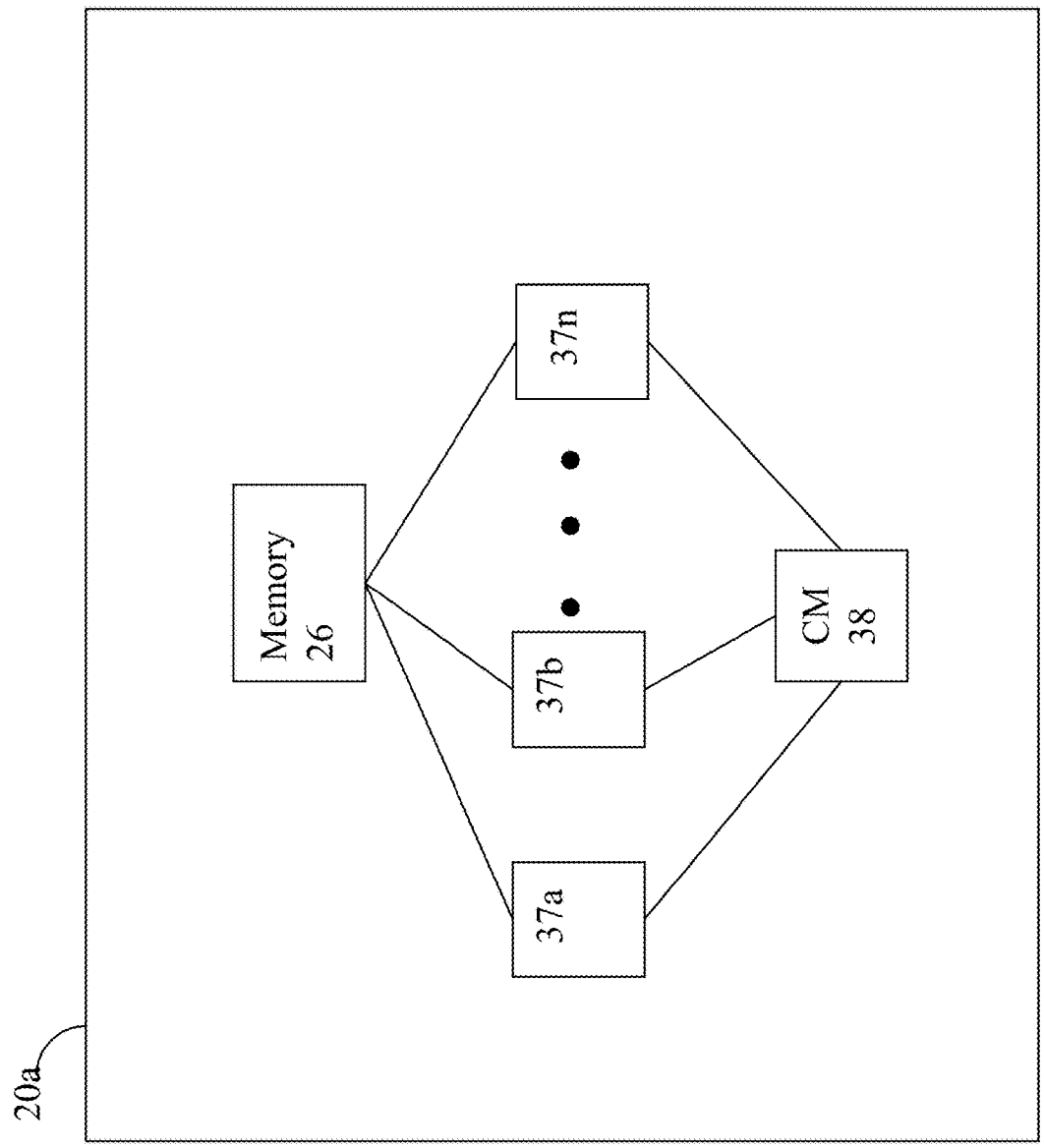
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to 128 directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

An embodiment of a data storage system used with techniques herein may have multiple PDs configured into RAID groups. RAID (redundant array of independent disks) groups and various RAID configurations are known in the art and refer to a group of multiple PDs or drive members having a specified RAID level and associated configuration providing data protection in case of failure of one of the PDs in the RAID groups. RAID levels known in the art may include, for example, RAID-1 (e.g., where data is mirrored on different PDs of the RAID group, RAID-5 (e.g., where data and parity information is stored on PDs of the RAID group), and the like. Thus generally a RAID group configuration uses multiple PDs to provide a combination of fault tolerance and/or improved performance for data storage devices. For example, a RAID-5 group includes multiple PDs and provides protection from a single PD failure with block level striping and distributed parity information, and RAID-6 provides protection from two PDS of the RAID group failing with two sets of distributed parity and block level striping.

A thin logical device or thin device is a type of logical device where units of storage are progressively allocated on an as-needed basis. Typically, the base units of storage are provisioned from multiple sets of PDs organized as RAID groups (discussed elsewhere herein), where these groups are partitioned into small portions sometimes referred to as slices, chunks, and the like. There is a mapping provided to relate the logical address in a thin device to the particular slice or chunk of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. A thin device is a logical device presented to the host which may be further mapped to a second layer of logical devices (also sometimes referred to as data devices) where the second layer of logical device may then be mapped to allocated physical storage of PDs. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US; U.S. Pat. No. 7,949,637, Issued May 24, 2011, STORAGE MANAGEMENT FOR FINE GRAINED TIERED STORAGE WITH THIN PROVISIONING, Burke; and U.S. Pat. No. 8,856,397, Issued Oct. 7, 2014, TECHNIQUES FOR STATISTICS COLLECTION IN CONNECTION WITH DATA STORAGE SYSTEM PERFORMANCE, to Marshak, et al., all of which are incorporated by reference herein.

In at least one embodiment of a data storage system used with techniques herein, the data storage system may also provide one or more data services. For example, the data storage system may perform any one or more of the following that can be enabled/disabled for data storage at different levels of storage granularity (e.g., per logical device, for specified portions of a logical device, etc.): compression/decompression, data deduplication, encryption/decryption, local data replication, remote data replication, and the like.

In some existing data storage systems, only a single DA may be allowed to actively manage each PD wherein only that single DA (not other DAs) may read and write data from the PD. A single DA may service multiple PDs. However in such systems, each PD may still only be actively managed by a single DA. If the active DA servicing one or more PDs fails, another DA may takeover to service I/Os and service the one or more PDs previously managed by the now failed DA. In such an existing system, for example, a RAID group of 4 PDs may be actively managed by the same single DA, and another second DA may serve as the passive DA for failover purposes should the single active DA fail (e.g., second passive DA assumes active role servicing all 4 PDs upon failure of single currently active DA). As such, the second passive DA may be characterized in one aspect as an under-utilized or idle data storage system resource.

In at least one data storage system in accordance with techniques herein, one or more PDs in the data storage system may be dual port PDs. With a dual (e.g., 2) port PD, I/Os may be issued to the PD over two connections such as by 2 different DAs. As such, with a dual port PD, 2 DAs may have the connectivity to allow for the PD to be concurrently and actively managed by 2 DAs whereby the 2 DAs are allowed to concurrently issue I/Os to the same PD. Described herein are techniques that may be used in a data storage system with such a multi-port PD where multiple DAs actively and concurrently manage and issue I/Os to the same multi-port PD. Following paragraphs describe how to manage and partition the single PD I/O workload and servicing among the multiple DAs, and other aspects of techniques herein. In at least one embodiment in accordance with techniques herein with a dual port PD, a RAID group may be configured, for example, to have 2 DAs actively service and manage each of the PDs of the RAID group.

Generally, following paragraphs utilize examples with a dual port PD where 2 DAs are allowed to service a single PD. However, more generally and as will be appreciated by those skilled in the art, techniques herein may be readily extended for use in connection with a multi-port PD having two or more ports where two or more DAs are allowed to concurrently and actively manage the single PD and allowed to concurrently and actively issue I/Os to the single PD. Thus in at least one embodiment in accordance with techniques herein with a multi-port PD, a RAID group may be configured, for example, to have 2 or more DAs actively service and manage all PDs of the RAID group. In following paragraphs, a logical device, having storage provisioned from one or more PDs, may be denoted as LDEV. In at least one embodiment, such a logical device or LDEV used with techniques herein may be a data device (as used in connection with thin devices), or a regular thick logical device. More generally, LDEVs used with techniques herein may be any logical device or entity mapped to provisioned physical storage.

Figure 3:
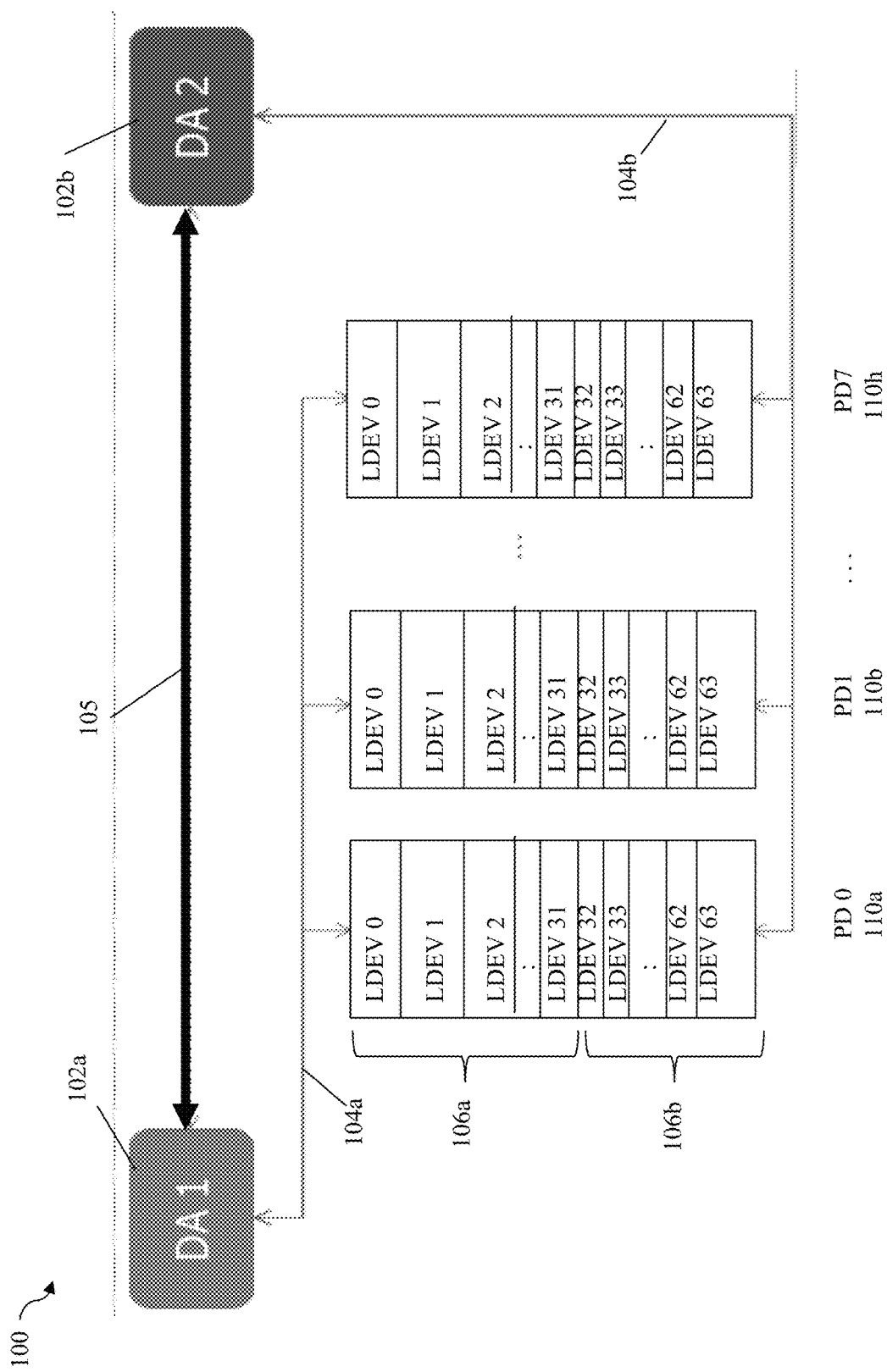
FIG. 3 is an example illustrating logical devices that may be stored in a RAID group of PDs serviced by multiple DA directors in an embodiment in accordance with techniques herein.

Referring to FIG. 3, shown is an example illustrating distribution of LDEVs among multiple PDs in an embodiment in accordance with techniques herein. The example 100 includes two DAs 102a, 102b; and 8 PDs 110a-h. More generally, techniques herein may be extended to any number of DAs (not limited to 2 DAs) and any number of PDs (not limited to 8 PDs). The 8 PDs 110a-h are PDs of a single RAID group configuration where all PDs 110a-h are concurrently serviced by both DAs 102a, 102b (e.g., both DAs 102a, 102b may concurrently issue I/Os to each of the PDs 110a-h). Element 104a denotes the connection between DA1 102a and PDs 110a-h used for communications therebetween, such as for reading and/or writing data of PDS 110a-h. Element 104b denotes the connection between DA2 102b and PDs 110a-h used for communications therebetween, such as for reading and/or writing data of PDs 110a-h. Element 105 denotes a connection between DAs 102a and 102b used for communication therebetween. Logical devices or LDEVs 0 through 63, have their storage provisioned from the 8 PDs 110a-h of the RAID group illustrated in FIG. 3.

An embodiment in accordance with techniques herein may distribute the 64 LDEVs 0 through 63 across all 8 PDs 110a-h of the RAID group. In this particular example, each LDEV is striped across all PDs of the RAID group. For example LDEV0 has its storage provisioned from all 8 PDs 110a-h of the RAID group where LDEV0's physical storage appears as a row or stripe across all PDs 110a-h (e.g., with equal amounts of LDEV0's storage provisioned from each of the 8 PDs 110a-h).

The configuration of FIG. 3 wherein DAs 102a, 102b both actively service I/Os to PDs 110a-h of the RAID group may be characterized as an active-active shared RAID group configuration.

Primary or active DA ownership of the LDEVs having storage provisioned from PDs 110a-h may be partitioned or distributed among the 2 DAs concurrently servicing PDs 110a-h. A DA designated as active or primary with respect to an LDEV may be assigned as the DA currently servicing I/O directed to that particular LDEV. A DA designated as passive or secondary with respect to an LDEV may not be actively servicing I/Os directed to the LDEV. Rather the secondary or passive DA with respect to an LDEV means the DA takes over when the LDEV's designated primary or active DA fails. Thus an LDEV's passive or secondary DA assumes the role as the active or primary DA upon failure of the LDEV's currently designated primary or active DA. Thus, only a single DA may be designated as primary DA and thus only a single DA may be servicing I/Os directed to the LDEV.

Techniques herein provide for distributing or partitioning the LDEVs having storage provisioned from the RAID group among the DAs 102a, 102b concurrently and actively servicing the RAID group. For such an active-active shared RAID group configuration, primary DA ownership of each LDEV of the RAID group may be assigned in a way that attempts to balance the workload (e.g., I/O workload) of the different LDEVs among the 2 DAs 102a, 102b. Thus, a distribution technique may be utilized which designates DA1 102a as the primary or active DA for a first portion of the 64 LDEVs, and which designates DA2 102b as the primary or active DA for the remaining second portion of the 64 LDEVs. The distribution technique has a goal of load balancing the active or primary DA role of management and I/O servicing of the LDEVs 0-63 among the DAs 102a, 102b.

In at least one embodiment, the 64 LDEVs may be partitioned with half or 32 of the LDEVs 106a having DA1 102a as their active or primary (e.g., owner) DA and DA2 102b as their passive or secondary DA; and with the remaining half or 32 LDEVs 106b having DA2 102b as their active or primary (e.g., owner) DA and DA1 102a as their passive or secondary DA. As a variation, the 64 LDEVs may be partitioned in a round-robin or alternating manner such as based on the LDEV number, where the first portion having DA1 102a as their active or primary (e.g., owner) DA and DA2 102b as their passive or secondary DA may be even numbered LDEVs (e.g., LDEVs 0, 2, 4, 6, . . . 62), and the second portion having DA2 102b as their active or primary (e.g., owner) DA and DA2 102a as their passive or secondary DA may be odd numbered LDEVs (e.g., LDEVs 1, 3, 5, 7, . . . , 63). The actual distribution may vary from this example depending on the particular distribution technique utilized.

In at least one embodiment, the distribution technique may perform the partitioning of the 64 LDEVs among the DAs 102a, 102b in accordance with one or more balancing criteria, where such balancing criteria may consider an attribute or property of the LDEV indicative of LDEV workload characteristics. The balancing criteria may include evenly distributing the total number of LDEVs among the DAs 102a, 102b (in a manner as discussed above) along with any other suitable criteria. In at least one embodiment, the one or more balancing criteria used by the distribution technique to designate primary DA for the LDEVs may include the compression ratio of each of the LDEVs. Let $R_c$ denote the compression ratio. For a particular LDEV, may be expressed as:

$$\text{size of LDEV before compression/size of LDEV after compression} \qquad \text{EQUATION 1}$$

To further illustrate, for an LDEV, the size before compression may be 100 GB and the size after compression may be 50 GB resulting in an $R_c$ of 2:1=2 or 50% compression savings or reduction in size due to compression. Generally, $R_c$ may be determined using any suitable technique (e.g., based on actual compression of entire LDEV, based on compression of a portion of less than entire LDEV, and the like). When considering $R_c$ for an LDEV, the distribution technique may, for example, balance primary DA ownership of the different LDEVs having different compression ratios among DAs 102a, 102b. For example, for the 64 LDEVs, assume a first group of 32 of the LDEVs, such as LDEVs 0 through 31, have a compression ratio of 50% and that the second group of the remaining 32 LDEVs 32 through 63 have a compression ratio of 30%. The distribution technique may then consider the different compression ratios and partition each of the first and second groups among the DAs 102a, 102b so that DA 102a is designated as primary DA for half of the first group (e.g., 16) of LDEVs (e.g., LDEVs 0 through 16) and half of the second group (e.g., 16) of LDEVs (e.g., LDEVs 32 through 47); and so that DA 102b is designated as primary DA for the remaining half of the first group (e.g., 16) of LDEVs (e.g., LDEVs 17 through 31) and half of the second group (e.g., 16) of LDEVs (e.g., LDEVs 48 through 63).

As a variation, assume the compression/decompression is not enabled or performed for all 64 LDEVs. For example, assume that compression/decompression is only performed for 16 of the 64 LDEVs. The balancing criteria may include considering whether or not compression/decompression is enabled or performed for each of the 64 LDEVs and then distribute primary DA ownership among DAs 102a, 102b evenly based on whether or not compression is enabled. A first portion of the 64 LDEVs having no compression/no decompression performed may be distributed evenly among the DAs 102a, 102b, and the remaining second portion of the 64 LDEVs having compression/decompression performed may be distributed evenly among the DAs 102a, 102b. In this example with compression performed for 16 LDEVs, 8 of these 16 LDEVs have DA 1 102a designated as the primary or active DA with the remaining 8 of the 16 LDEVs having DA 2 102b designated as the primary or active DA. Additionally, with no compression performed for 48 of the 64 LDEVs, 24 of the 48 LDEVs have DA 1 102a designated as the primary or active DA with the remaining 24 of the 48 LDEVs having DA 2 102b designated as the primary or active DA.

It should be noted the foregoing examples result in an exactly even distribution of a particular group or portion of LDEVs when considering a particular criterion, attribute or property of the LDEVs under consideration. However, it may be that the distribution of LDEVs among the DAs 102a, 102b may be result in an exactly even or balanced distribution with respect to a particular criterion, property or attribute (e.g., such as where there is an odd number of LDEVs with compression enabled and an add number of LDEVs with compression not enabled). In such a case, an embodiment may distribute the LDEVs among DAs 102a, 102b based on the one or more balancing criteria as evenly as possible. Generally, an embodiment use any suitable technique to determine or select which of the DAs 102a, 102b are assigned as a primary or active DA for the LDEVs which attempts to load balance the workload of the LDEVs among the DAs 102a, 102b.

As another example, the balancing criteria used to distribute primary DA ownership of the LDEVs among DAs 102a, 102b may consider the type of LDEV where the type may denote a data layout indicating the format in which data is stored on the LDEVs. For example, in at least one embodiment, the LDEVs may store data in accordance with (e.g., have a data layout based on) a CKD (count key data) device type or an FBA (fixed block architecture) device type, each having a particular format, layout and architecture. Whether an LDEV is designated as having the CKD or FBA device type attribute/property may vary with the particular host operating system and supported protocols used as discussed briefly below.

In at least one embodiment, some of the LDEVs 0-63 of FIG. 3 may have a data layout based on the CKD (count key data) architecture and format, and one or more of the hosts 110a-c may access data of a CKD LDEV using a FICON connection. IBM's FICON (Fiber Connection) is a Fibre Channel protocol that provides high-speed connectivity between a channel and a control device and allows multiple data exchanges in full duplex mode. FICON may be used with Fibre Channel communication. FICON is compatible with z/Architecture computing systems in connection with I/O devices performing I/O processing therewith.

CKD may be characterized as a data storage device architecture where each storage device record includes of a count field, an optional key field, and a ("user") data field with error correction/detection information appended to each field. The sizes of the records within a single device may vary with the CKD architecture. Since data record lengths can vary, they all have an associated count field which indicates the size of the key if used and the size of the data. The count field has the identification of the physical location in cylinder-head-record format, the length of the key, and the length of the data. The key may be omitted or consist of a string of characters. Most often the key is omitted, the record located sequentially or by direct cylinder-head-record addressing. If it is present, the key is typically a copy of the first n bytes of the data record but can be any data which will be used to find the record. The key (and hence the record) is locatable via hardware commands.

As known in the art and mentioned above, I/O requests directed to LDEVs in accordance with the CKD format may be in the form of channel programs (also known as channel word programs or chains) including an ordered sequence of channel command words (CCWs); or transport mode (TCW) and the associated device command words (DCWs). Additionally, channel word programs, processing I/O requests, and the like, are described also, for example, in U.S. Pat. No. 6,954,835, INTERCEPTING CONTROL OF A HOST I/O PROCESS, issued Oct. 11, 2005 (the '835 patent); U.S. Pat. No. 6,986,009, INTERCEPTING CONTROL OF A HOST I/O PROCESS, issued Jan. 10, 2006 (the '009 patent); and U.S. Pat. No. 7,707,186, issued Apr. 27, 2010, METHOD AND APPARATUS FOR DATA SET MIGRATION (the '186 patent), all of which are incorporated by reference herein.

In at least one embodiment, a host may have an architecture based on IBM Corporation's System z architecture and computing environment. System z components, such as the host, may operate with IBM's z/OS (operating system) and/or other zSeries operating systems. I/O devices may be coupled to interact with mainframe computers, such as IBM's System z computing environment, that may include an I/O subsystem that communicates with the I/O devices over communication channels. The I/O subsystem controls data flow between I/O devices and main storage. The I/O subsystem may be coupled to the central processors of the main system and may communicate directly with the I/O devices. I/O subsystem may communicate with the I/O devices using multiple types of interfaces, including, for example, communication channels such as Fibre channels. For further discussion of z/OS and z/Architecture components, see, for example, Loveland, et al., "Testing z/OS: The premier operating system for IBM's zSeries server," IBM Systems Journal, Vol. 41, No. 1, 2002, pp. 55-73, and Plambeck, et al., "Development and attributes of z/Architecture," IBM J. Res. & Dev., Vol. 46, No. 4/5, July/September 2002, pp. 367-379, which are incorporated herein by reference. See also, z/Architecture: Principles of Operation, IBM, SA22-7832-04, 2005 for a detailed z/Architecture description. In at least one embodiment, the hosts 110a may be an IBM z series mainframe computing system running a version of the z/OS operating system. In such an embodiment, the host may use a FICON connection to access data of an LDEV having the CKD data format. For further discussion of FICON in connection with IBM System/390, a precursor to IBM System z, see DeCusatis, et al., "Fiber optic interconnects for the IBM S/390 Parallel Enterprise Server G5," IBM J. Res. Develop., Vol. 43, No. 5/6, September/November 1999, pp. 807-828, which is incorporated herein by reference.

A host having data stored on some of the LDEVs 0-63 of FIG. 3 may alternatively be running a UNIX or LINUX-based operating system and which may further include hardware based on an Intel-based architecture such as an x86 architecture. (The term x86 may refer to a family of instruction set architectures based on the Intel 8086 CPU). The host may access data on an LDEV having its data stored in accordance with a fixed block architecture (FBA). FBA may be characterized as another storage device data architecture where the data of the LDEV is mapped over fixed size blocks or sectors. With the FBA architecture, the location of any block can be calculated to retrieve that block. This architecture uses tracks and cylinders. A physical disk contains multiple blocks per track, and a cylinder is the group of tracks that exists under the disk heads at one point in time without performing a seek operation. Thus, an LDEV with FBA has a data layout in which each addressable record, such as a block, on disk is of the same size such as providing for logical block addressing (LBA). The FBA architecture may be used with different connectivity or attachment methodologies and standards than those used in connection with the CKD architecture. For example, the FBA may be an architecture supported and utilized by a host when accessing LDEVs over a SCSI/FC connection rather than a FICON connection. The SCSI/FC connection and FBA architecture may be used, for example, with a host as described above running a UNIX or LINUX-based operating system on an Intel-based architecture such as an x86 architecture.

In at least one embodiment, the LDEVs 0-64 may either have the FBA or CKD attribute or property whereby the distribution technique that distributes primary DA ownership among DAs 102a, 102b may include balancing criteria that considers the FBA or CKD attribute. In such an embodiment, processing may distribute the portion of LDEVs having the FBA attribute as evenly as possible among DAs 102a, 102b; and similarly to distribute the portion of LDEVs having the CKD attribute as evenly as possible among DAs 102a, 102b. What will now be described are further details regarding how distribution of LDEVs 0-63 based on the FBA and CKD attribute may be performed in at least one embodiment in accordance with techniques herein. Consider a case where more of the LDEVs are FBA than CKD. Assume a first portion of the LDEVs alternate between FBA and CKD with the remaining LDEVs all being FBA. Also assume about 20% of the 64 LDEVs are CKD (e.g., about 13 LDEVs) with the remaining approximately 80% being FBA (e.g., 38 LDEVs).

Referring to FIG. 4, shown is an example 150 illustrating a distribution pattern of the FBA or CKD attribute being associated with the 64 different LDEVs of Figure. The table 150 includes a first column 152 denoting the LDEV ID, a second column 154 denoting either the CKD or FBA attribute designation for each of the LDEVs, and a third column 156 designating the assigned primary DA or DA owner for each LDEV. Each row of the table 150 denotes, for the LDEV identified in column 152, whether the LDEV has its data stored in accordance with the CKD (C) or FBA (F) architecture, format and layout (as denoted by column 154), and the DA assigned to the LDEV (as denoted by column 156).

Column 154 of the table 150 indicates that the first 26 LDEVs—LDEVs 0 through 25—alternate between F and C device types and the remaining 38 LDEVs—LDEVs 26 through 63—are F device type. Given the foregoing attribute or property pattern designation for the LDEVs as illustrated in column 154 of the table 150 of FIG. 4, primary or active DA designation (e.g., DA ownership) as denoted in column 156 may be assigned based on the following calculation:

$$\text{index of } DA = \left(\frac{LDEV\ ID}{\text{number of types}}\right) \% \text{ num DAs in group} \quad \text{EQUATION 2}$$

Where:
"index of DA" denotes the assigned primary or active DA and is either 0 denoting DA1 102a, or is 1 denoting DA2 102b;
"LDEV ID" denotes the index or identifier uniquely identifying one of the 64 LDEVs (e.g., is an integer that is 0 or more);
"number of types" denotes the number of different types (e.g., such as CKD and FBA) being considered for the property or attribute being distributed; "number DAs in group" denotes the number of DAs that can be designated as a primary or active DA of an LDEV (e.g., denotes the number of DAs for which processing is distributing primary DA ownership); and "%" denotes the mathematical modulus operator (e.g., the result of the division operation results in a quotient and remainder and modulus operator returns the remainder only of the division operation thereby discarding the integer quotient).

In connection with the particular example as described in connection with FIGS. 3 and 4: the property or attribute can be either CKD or FBA whereby the "number of types" in EQUATION 2 is therefore 2; and the "number of DAs in the group" is 2 (e.g., since processing is distributing primary ownership of the LDEVs among DAs 102a and 102b).
In EQUATION 2, it should be noted that the expression:

$$\left(\frac{LDEV\ ID}{\text{number of types}}\right)$$

denotes the division operation where LDEV ID is divided by "number of types" and the integer quotient result of the expression is returned and the remainder, if any, is discarded. Using the modulus "%" operator in the above, the integer quotient result of the expression $$\left(\frac{LDEV\ ID}{\text{number of types}}\right)$$

is then divided by "num DAs in group" (e.g. 2 in this example) where the modulus operator the returns the remainder only of this latter division operation. For example, for LDEV 6, the index of DA computed using EQUATION 2 is 1, thereby denoting DA 2 102b (e.g., 6/2=3, then 3%2 results in a final answer of 1); for LDEV 7 the index of DA computed using EQUATION 2 is 1 thereby denoting DA 2 102b (e.g., 7/2=quotient 3, then 3%2 results in a final answer of 1); for LDEV 8 the index of DA computed using EQUATION 2 is 0 thereby denoting DA 1 102a (e.g., 8/2=4, then 4%2=0 as the final answer).

Use of EQUATION 2 guarantees that FBA LDEVs are equally distributed among all DAs 102a, 102b and that CKD LDEVs are also equally distributed among all DAs 102a, 102b. Column 156 of table 150 of FIG. 4 indicates the designated primary DA or owner of each of the LDEVs assigned using EQUATION 2 above. Column 156 denotes the assigned primary DA as either DA 1 102a or DA2 102b, where DA 1 102a has a computed index value of 0 from EQUATION 2, and where DA 2 102b has a computed index value of 1 from EQUATION 2. In column 156, the computed index associated with each of the DAs is shown in parenthesis next to the particular assigned DA.

Referring to FIG. 5, shown is a table summarizing the distribution of LDEVs among the two DAs based on EQUATION 2 in an embodiment in accordance with techniques herein. The table 200 includes a first column denoting the type or attribute 202, a second column 204 denoting the LDEV count, a third column 206 DA 1 206, and a fourth column 208 DA1. Row 210 indicates that there are 51 LDEVs (column 204) with the FBA type (202) and 25 of those 51 LDEVs are assigned primary DA 1 (206) and 26 of those 51 LDEVs are assigned as primary DA 2 (208). Row 212 indicates that there are 13 LDEVs (column 204) with the CKD type (202) and 7 of those 13 LDEVs are assigned primary DA 1 (206) and 6 of those 13 LDEVs are assigned as primary DA 2 (208). Row 214 indicates that overall for both CKD and FBA types combined there are 64 LDEVs (column 204) with either the FBA or the CKD type (202) and 32 of those 64 LDEVs are assigned primary DA 1 (206) and 32 of those LDEVs are assigned as primary DA 2 (208). Thus, using EQUATION 2, the 64 LDEVs are equally distributed among the 2 DAs 102a, 102b and, additionally, a first portion of those LDEVs which are CKD (e.g., 13) is approximately evenly distributed among the 2 DAs 102a, 102b, and a remaining second portion of those LDEVs which are FBA (e.g., 51) is approximately evenly distributed among the 2 DAs 102a, 102b.

Referring to FIG. 6, shown is another example 300 illustrating distribution based on decompression rates in an embodiment in accordance with techniques herein. In connection with the table 300, assume a single RAID group has stored therein data for 16 LDEVs having LDEV IDs in the range [1, 16]. The table 300 includes a first column 302 LDEV ID, a second column DCR (data compression rate) 304, and third column primary DA owner 306. Each row of the table 300 indicates, for the LDEV ID 302 of that row, the DCR and primary DA owner 306 of the LDEV. Values for the DCR provided in column 304 may denote the rate at which data is compressed and thereby provide a different form or way of expressing the amount of compression achieved. DCR is a different way of expressing the Rc as noted above using EQUATION 1. Rather than express the rate of compression as a ratio as with Rc above, DCR may denote an implied ratio of the DCR value to 1. For example, the first row of the table 300 indicates that LDEV 2 has a DCR of 2 or a 2:1 compression rate (which is the same as an $R_c$ value of 50% using EQUATION 1).

In at least one embodiment, the distribution technique may distribute LDEVs among the 2 DAs servicing all PDs of the single RAID group based on the DCRs of the LDEVs. The distribution technique may sort the 16 LDEVs based on two sort criteria—primary sort criteria which indicates to sort the LDEVs based on increasing DCR values, and secondary sort criteria utilized to further sort LDEVs having the same DCR, where the secondary sort criteria indicates, for multiple LDEVs having the same DCR, further sort the multiple LDEVs by ascending LDEV ID. For example, the LDEVs appear in the table 300 based on increasing DCR values in column 304. Furthermore, for LDEVs having the same DCR value, such as in the case 310 where the first 3 entries or rows of table 300 have a DCR value of 2, the 3 rows 310 are further sorted by increasing LDEV ID. Based on the sorted LDEV IDs having an order as in table 300, the LDEVs are assigned primary DAs in a round robin or alternating manner (e.g., every other row of the table is assigned a different one of the 2 DAs DA1 102a, DA2 102b).

In at least one embodiment, such techniques as described above may be used to determine an initial configuration or initial distribution of a group of LDEVs among multiple primary DAs servicing a RAID group from which the group of LDEVs have their physical storage provisioned. At various times subsequent to the initial distribution, there may be configuration changes, such as when an LDEV is configured or provisioned from storage of the RAID group, or when an existing LDEV having storage provisioned on the RAID group is deleted or removed. In such a case, processing may be performed to rebalance distribution of LDEVs among the multiple primary DAs, as needed, in accordance with the configuration change. Removing an existing LDEV having storage provisioned from the RAID group or configuring a new LDEV having storage provisioned from the RAID group is a change to the existing distribution which may, or may not, result in a further rebalancing of the distribution. Generally, an embodiment may perform an assessment as to whether or not the change to the existing distribution should trigger a further rebalancing of the distribution. For example, referring back to FIG. 3, assume that all 64 LDEVs are currently distributed evenly among primary DAs 102a, 102b whereby LDEVs 0 through 31 have DA 1 102a as the assigned primary DA and DA 2, 102b as the assigned secondary DA; and whereby LDEVs 32-63 have DA 2 102b as the assigned primary DA and DA 1, 102a as the assigned secondary DA. For simplicity of illustration, assume such distribution is based solely on the number of LDEVs per DA and no other property or balancing criteria. Subsequently, at a second point in time, assume one of the LDEVs, LDEV 0 is deleted. In response, processing may be performed to simply remove primary and secondary DA assignments for LDEV 0 resulting in a net change where DA 1 102a serves as primary DA for 31 LDEVs and DA 2 102b serves as primary DA for 32 LDEVs. An assessment may be performed based on the resulting state or conditions where a determination is made that no further processing or rebalancing is needed.

At a third point in time subsequent to the second point in time, assume that 4 more LDEVs—LDEVs 1-4—are deleted. In response, processing may be performed to remove primary and secondary DA assignments for LDEVs 1-4 resulting in a net change or state where DA 1 102a serves as primary DA for 27 LDEVs and DA 2 102b serves as primary DA for 32 LDEVs. Assessment may be performed based on the foregoing state where a determination is made that further processing and rebalancing is needed. In this case, it may be determined that the resulting state or net change of removing the additional 4 LDEVs triggers rebalancing due to the difference or degree of imbalance in distribution of LDEVs among the different primary DAs. Processing may be performed to balance as evenly as possible the total number of 59 LDEVs among the primary DA 1 102a and primary DA 102b. To accomplish this, the 59 LDEVs should be split as evenly as possible among the two primary DAs 102a, 102b where one of the DAs is designated as primary DA for 30 of the LDEVs and the other of the two DAs is designated as the primary DA for the remaining 29 LDEVs. Processing may be performed to accomplish such redistribution while also minimizing the changes made to existing LDEV primary DA designations in efforts to minimize rebalancing costs (e.g., adverse side effects, resource consumption, and the like) incurred as a result of the rebalancing. In this example, DA 1 now 102a serves as primary DA for 27 LDEVs and DA 2 102b now serves as primary DA for 32 LDEVs. It may be determined to perform rebalancing of the distribution and reassign 2 LDEVs from DA 2 102b whereby the 2 LDEVs are reassigned to primary DA 1 102a. The foregoing achieves an acceptable resulting balanced state with 29 LDEVs assigned DA 1 102a as the primary DA and with 30 LDEVs assigned DA 2 102b as the primary DA.

At a fourth point in time subsequent to the third point in time, assume that 1 new LDEV, LDEV 64, is configured and has its storage provisioned from the RAID group of PDs of FIG. 3. Processing must determine which of the DAs 102a, 102b to designate as the primary DA for LDEV 64. It may be determined that LDEV 64 is assigned DA 102a as its primary DA since this results in the most desirable state/ achieves the most acceptable resulting balanced state with 30 LDEVs assigned DA 1 102a as the primary DA and with 30 LDEVs assigned DA 2 102b as the primary DA. No further rebalancing is needed.

As another example illustrating a configuration change, reference is made back to FIG. 6. Assume that there are 16 LDEVs having storage provisioned from a RAID group of 8 PDs serviced by two primary or active DAs 102a, 102b. In other words, in this example, assume the RAID group, PDs and DAs as in FIG. 3 with the difference that there are only 16 LDEVs rather than 64 and where the 16 LDEVs are assigned primary DAs based on an initial distribution as denoted by column 306 in FIG. 6.

At a second point in time, assume that 2 LDEVs—LDEV 90 and 91, are configured to have storage provisioned from the RAID group of PDs as in FIG. 3 where LDEV 90 has a DCR of 2 and LDEV 91 has a DCR of 5. Responsive this configuration change, processing is performed to assign LDEVs 90 and 91 each a primary DA selected from the group of DAs 102a, 102b. The current state of primary DA assignment distribution of LDEVs 1-16 among DAs 102a, 102b is 8 LDEVs currently assigned to each of the DAs. Furthermore, assessment processing determines that DA 1

102a is assigned as primary DA to 2 LDEVs—LDEV 2 and 10—each having a DCR of 2; and DA 2 102b is assigned as primary DA to one LDEV—LDEV 3—having a DCR of 5. In efforts to maintain both an even overall distribution of LDEVs among the primary DAs 102a, 102b and additionally distribute LDEVs of each DCR value as evenly as possible among primary DAs 102a, 102b, processing may assign DA2 102b as primary DA for LDEV 90 and may assign DA1 102a as primary DA for LDEV 91. As a result, the state of the distribution is that each of the DAs 102a, 102b is designated as primary DA for 9 LDEVs. Furthermore, the resulting distribution state has a total of 4 LDEVs (e.g., 2, 9, 10 and 90) with DCR=2 where the 4 LDEVs are evenly distributed among the primary DAs 102a, 102b; and the resulting distribution state has a total of 2 LDEVs (e.g., 3 and 91) with a DCR=5 where the 2 LDEVs are evenly distributed among the primary DAs 102a, 102b. No additional rebalancing is needed since the new LDEVs 90 and 91 may be added to an existing configuration resulting in an even distribution with respect to all LDEVs and with respect to LDEVs having the DCR values 2 and 5.

Thus, an embodiment in accordance with techniques herein may perform processing to achieve a desired balance state as a goal of determining an initial distribution of LDEVs among multiple primary DAs, and also when rebalancing (responsive to a configuration change) to determine a redistribution of LDEVs among multiple primary DAs. In all cases, the processing to determine the distribution or redistribution may be performed based on one or more balancing criteria, for example, such as whether each of the DAs that may be assigned as a primary or active DA owner has an equal number of LDEVs, whether each such primary DA has an equal number of LDEVs with a particular DCR, whether each such primary DA has an equal number of DAs of a particular device type (e.g., FBA and CKD), and the like.

Figure 7:
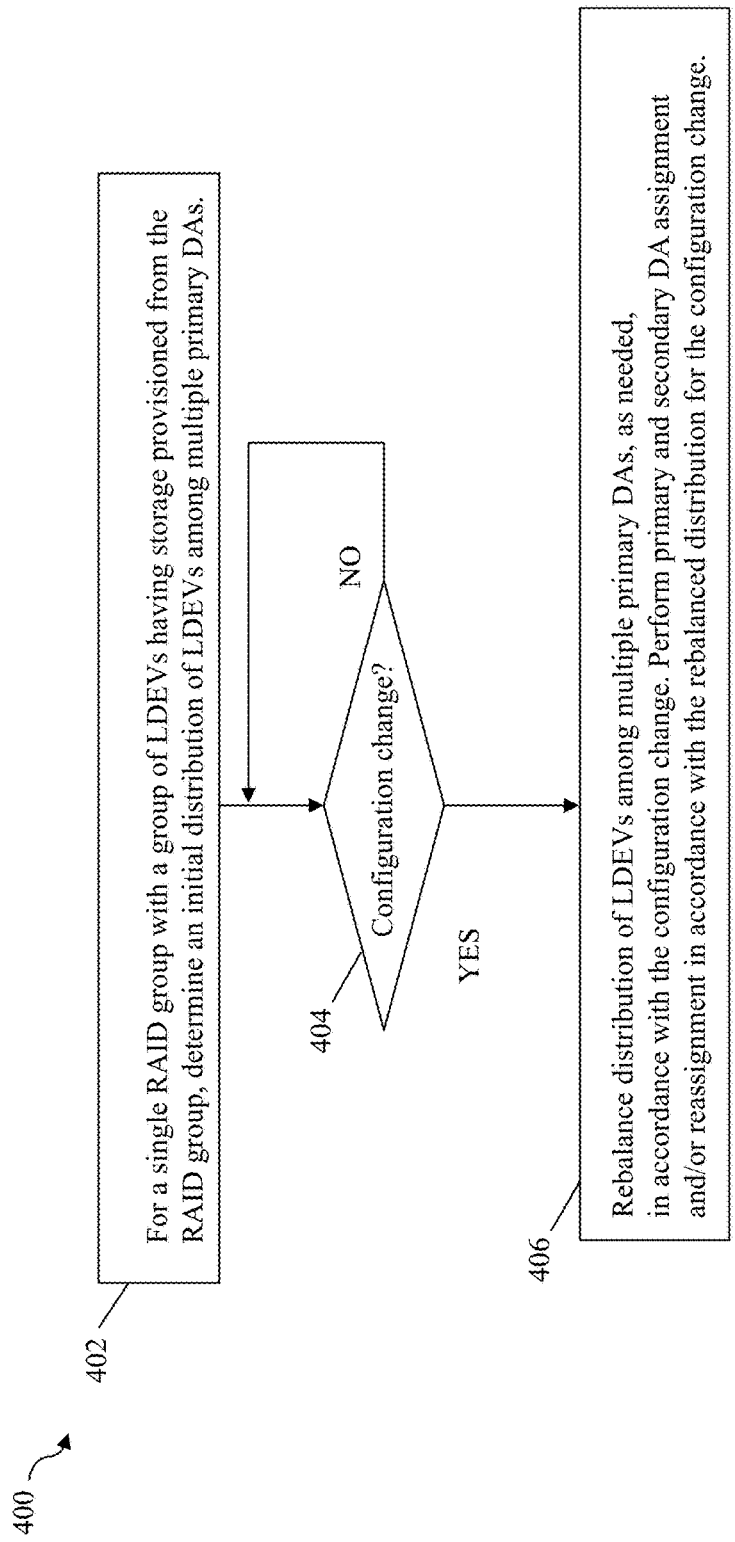
FIGS. 7 and 8 are flowcharts of processing steps that may be performed in an embodiment in accordance with techniques herein.

Referring to FIG. 7, shown is a flowchart 400 of processing steps that may be performed in an embodiment in accordance with techniques herein. The flowchart 400 summarizes processing steps described above. At step 402, for a single RAID group with a group of LDEVs having storage provisioned from the RAID group, determine an initial distribution of LDEVs among multiple primary DAs. From step 402, control proceeds to step 404 to wait for a configuration change with respect to the existing RAID group having an initial distribution determined as in step 402. At step 404, a determination is made as to whether there has been a configuration change, such as when an LDEV is added and has its storage provisioned from the RAID group with the initial distribution (determined in step 402), when an LDEV is removed from the RAID group with the initial distribution (determined in step 402), when a new device type is added (e.g., add a third device type in addition to CKD and FBA), and the like. If step 404 evaluates to no, control remains at step 404. If step 404 evaluates to yes, control proceeds to step 406. At step 406, processing is performed to rebalance distribution of LDEVs among multiple primary DAs, as needed, in accordance with the configuration change. Step 406 includes performing primary and secondary DA assignment and/or reassignment, as may be needed, in accordance with the rebalanced distribution for the configuration change. At the completion of step 406, the LDEVs are distributed among the primary DAs resulting in an acceptable balanced distribution or state. It should be noted that the ending state may not completely and equally distribute all LDEVs among all primary DAs with respect to all balancing criteria (e.g., with an even number of primary DAs and an odd number of LDEVs). However, in at least one embodiment, the ending state and distribution/redistribution of LDEVs among primary DAs may be one that is as balanced as possible based on the one or more balancing criteria specified where the processing performed to achieve the ending state may attempt to minimize the number of primary DA reassignments of existing LDEVs.

As described above and illustrated, for example, in connection with FIG. 7, rebalancing LDEVs among primary DAs may be performed responsive to a configuration change. More generally, rebalancing may be triggered responsive to an occurrence of any of a defined set of trigger conditions. For example, an embodiment may monitor actual I/O workload of the different primary DAs and rebalancing may be performed responsive to determining that the observed I/O workload of the different primary DAs varies by more than a specified threshold or tolerance. In other words, balancing and rebalancing may be performed based on one or more balancing criteria such as properties of the LDEVs as well as based on observed workload of the different primary DAs (e.g., where the primary DA assignment of LDEVs is among the different primary DAs). The observed workload of the DAs may be determined using one or more metrics or statistics which are monitored, for example, during periodic sampling. The metrics or statistics may include one or more of: data transfer rate or amount of data read and written with respect to the RAID group PDs by the DA during a sampling period, average utilization (e.g., % utilization) of each primary DA during a sampling period, and the like.

In connection with processing described herein, such as in connection with rebalancing, it may be necessary to sometimes change DA ownership or reassign a designated primary DA of an LDEV. For example, LDEV 1 may be initially assigned DA 1 102 a as its primary DA and thus DA2, 102b as its secondary DA. As a result of rebalancing the distribution of LDEVs among the primary DAs 102a, 102b, DA ownership (e.g., primary DA designation) of LDEV 1 may change or transition from DA1 102a to DA2 102b. Since the data storage system may be online (e.g., up and running and actively processing I/O operations), there may be I/Os currently inflight or pending where such I/Os are currently being serviced by DA1 120a when the abovenoted DA ownership change occurs. In at least one embodiment, LDEV state information may denote which of the DAs 102a, 102b is assigned as the LDEV's primary DA (e.g., owner or active DA) and which of the DAs 102a, 102b is assigned as the LDEV's secondary DA (e.g., passive). The LDEV state information, and possibly other state information, may be updated as needed to reflect and changes in primary DA and secondary DA designation for each LDEV as may occur as the result of an event such as rebalancing, failover processing (e.g., current DA primary fails so secondary DA becomes new primary DA), and the like.

Figure 8:
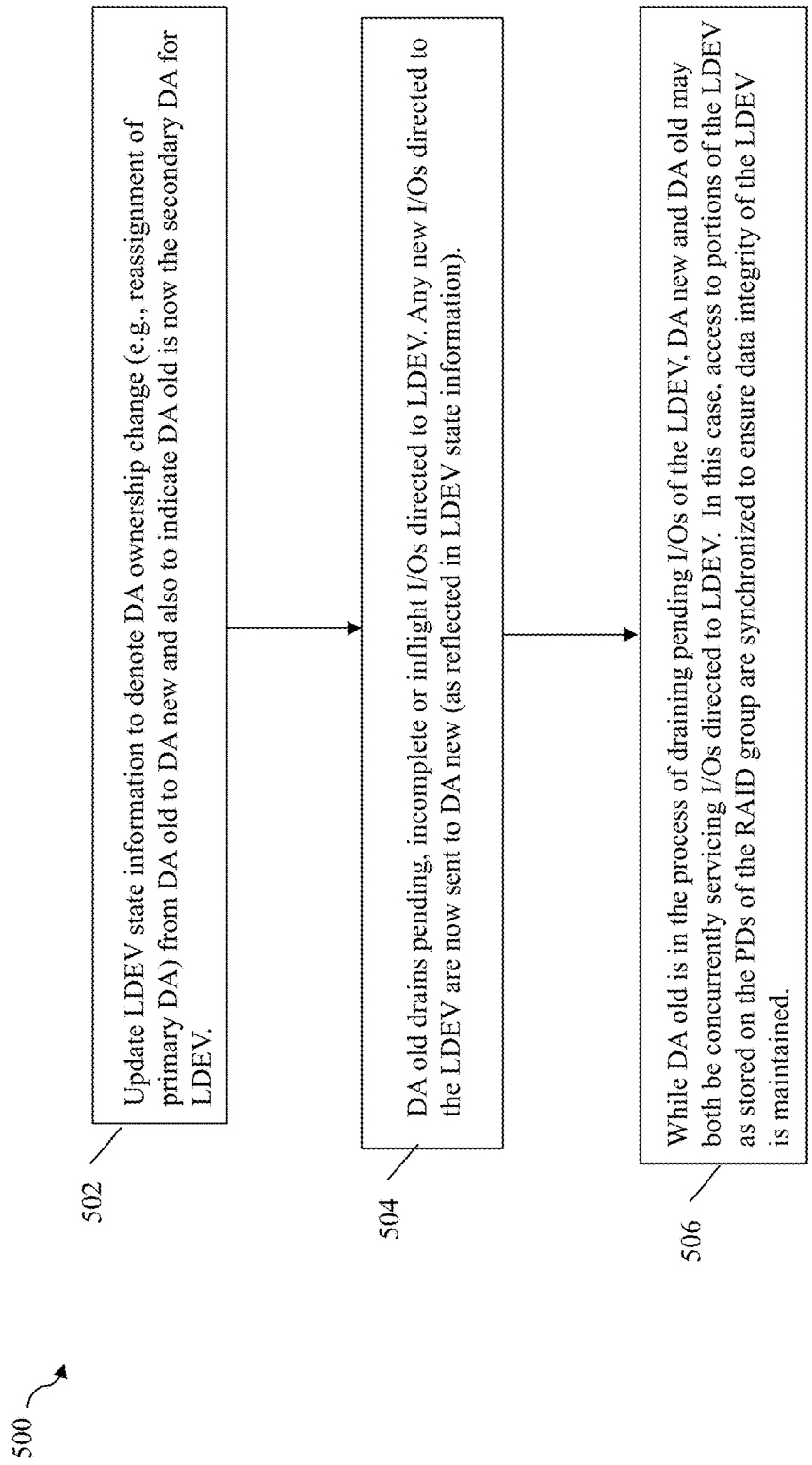

Referring to FIG. 8, show is a flowchart 500 of processing steps that may be performed in an embodiment in connection with a DA ownership change in an embodiment in accordance with techniques herein. Flowchart 500 processing is performed with respect to a single LDEV for a DA ownership change. DA old denotes the current primary DA which is being updated to DA new. At step 502, processing is performed to update the LDEV state information to denote the DA ownership change (e.g., reassignment of primary DA) from DA old to DA new, and also to indicate DA old is now the secondary DA for the LDEV. From step 502, processing proceeds to step 504. In step 504, DA old drains any pending, incomplete or inflight I/O directed to the LDEV. Draining such I/Os lets the I/O processing complete where such processing is performed by the DA old. Also in step 504, any new I/Os directed to the LDEV are now sent to DA new, as reflected in the updated LDEV state information (e.g., updated in prior step 502). From step 504, processing proceeds to step 506. In step 506, while DA old is in the process of draining pending I/Os of the LDEV, DA new and DA old may both be concurrently servicing I/Os directed to LDEV. In this case, access to portions of the LDEV as stored on the PDs of the RAID group are synchronized to ensure data integrity of the LDEV is maintained. In at least one embodiment, a locking mechanism may be utilized to synchronize access to such portions of the LDEV data stored on the various PDs of the RAID group. For example, the locking mechanism may provide exclusive access to a data portion of the LDEV stored on one of the RAID group PDs while DA old or DA new is writing to the data portion; may allow multiple readers access to the data portion of the LDEV stored on one of the RAID group PDs while both DA old and DA are reading the data portion; and the like. An embodiment may provide such locking or other synchronization mechanism at any suitable level of granularity (e.g., such as provide for locking chunks of the LDEV, locking at the PD level, and the like).

In at least one embodiment in accordance with techniques herein, a PD level locking mechanism may be provided for use in connection with PDs of the RAID group serviced by a group of primary or active DAs, such as DAs 102a, 102b. The PD locking mechanism may provide a per PD exclusive ownership lock that may be used to coordinate any PD level operation that can affect all DA owners or primary DAs servicing LDEVs having data stored on the PD. Exclusive ownership of the PD level lock associated with one of the PDs by a DA is required prior to allowing the DA to perform any such disruptive operations with respect to the PD associated with the PD level lock. The disruptive operation may generally be any PD level operation requiring exclusive access to the PD prior to performing the operation. Examples of such operations requiring exclusive access to the PD and therefore requiring acquisition or ownership of the PD level lock are discussed in more detail below (e.g., prior to taking the PD offline such as due to PD error or unhealthy state while the data storage system is online/operational servicing I/Os).

In at least one embodiment, the PD lock may have an associated priority denoting the priority of the request or operation for which the PD lock is being requested or has been acquired. Thus, each request for the PD lock may be associated with a priority of the request. A current holder/owner of the PD lock may be pre-empted by a subsequent request for the PD lock if the subsequent request for the lock has an associated priority that is higher than another priority associated with the current holder/owner of the lock.

Figure 9:
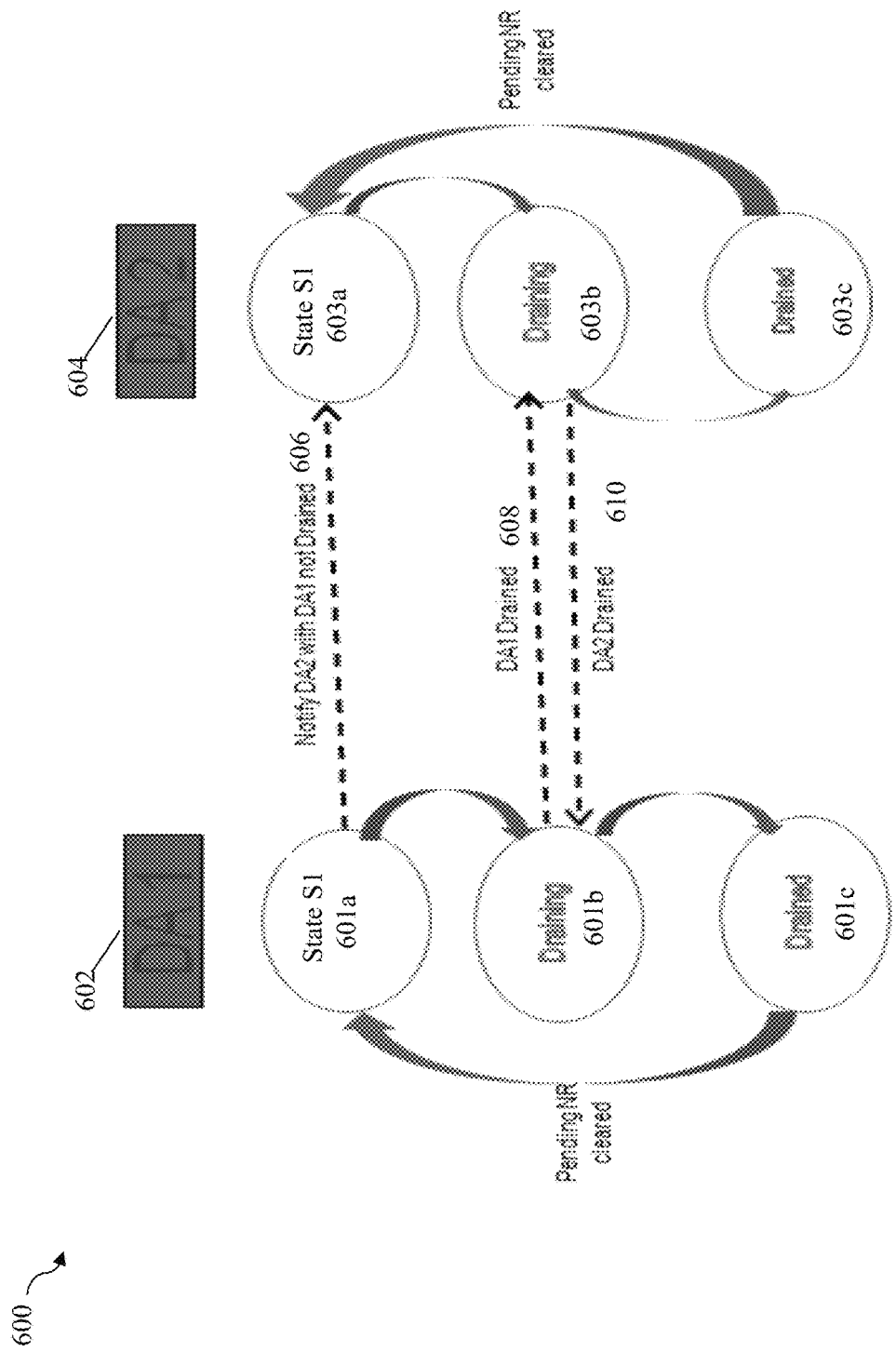
FIG. 9 is an example illustrating synchronous I/O draining that may be performed for a physical storage device in an embodiment in accordance with techniques herein.

In connection with PD management operations, or more generally, an operation that modifies the state of the PD from active/online/ready (e.g., where I/Os reading to/writing from the PD are being actively serviced) to generally offline/unavailable/not ready, processing may be performed for synchronous draining of I/Os directed to the PD, where such I/Os may be serviced by any of the DAs 102a, 102b for any of the LDEVs having data stored on the PD. Such synchronous I/O draining for the PD may be performed in connection with taking the PD offline, for example, prior to running a recovery task, performing a corrective error recovery operation, taking the PD out of commission (e.g., removed from the data storage system), and the like. An example of synchronous I/O draining for a PD is discussed below in connection with FIG. 9 since PD may be accessed by one or multiple DAs in an embodiment in accordance with techniques herein. In at least one embodiment in accordance with techniques herein, PD management may be initiated by either DA 1 602 or DA 2 604 of FIG. 9. It should be noted that elements 602, 604 of FIG. 9 are analogous respectively to DAs 102a and 102b of FIG. 3. For example, one of the DAs 602, 604 may detect problems, errors or pending failure of the PD and may initiate processing to take the PD offline. As a first step, the initiating DA acquires exclusive access to the PD by acquiring its the PD level lock prior to initiating the synchronous draining as described below in connection with FIG. 9. Subsequently, once the initiating DA acquires exclusive PD access via acquiring the PD level lock, FIG. 9 processing for synchronous I/O draining may be performed.

Referring to FIG. 9, shown is an example 600 of synchronous I/O processing that may be performed with respect to a PD in an embodiment in accordance with techniques herein. In this example, assume that synchronous I/O draining of the PD is being performed prior to transitioning the PD into a not ready (NR) state where the PD is dropped or taken offline. Thus, the synchronous I/O draining may be performed while the PD is in a pending NR state that may be initiated by either DA 1 602 or DA 2 604. In this example assume that DA 1 602 initiates the processing and sets the PD state to pending NR. DA 1 602 then notifies (606) the DA 2 604 that DA 1 602's I/Os are not yet drained from the PD, and also signals for DA2 604 to drain its I/Os from the PD. Responsive to receiving the notification 606, DA 2 604 then commences draining its I/Os from the PD. When draining I/Os of the PD, both DAs 602 and 604 may queue any pending I/Os, may return an error, or take some other action so as not to start any newly received I/O directed LDEV data stored on the PD being taken offline. Once DA 1 602 commences draining its I/Os from the PD, it transitions from its current state S1 601a into the draining state 601b. Once DA 2 604 commences draining its I/Os from the PD, it transitions its current state S1 603a into the draining state 603b. Once DA 1 602 completes draining all its pending I/Os from the PD, DA 1 602 sends (608) a notification to DA 2 604 that DA 1 602 has completed draining its pending I/Os from the PD. Once DA 1 602 has completed draining its I/Os to the PD, it transitions from the draining state 601b to the drained state 601c. Once DA 2 604 completes draining all its pending I/Os from the PD, DA 2 604 sends (610) a notification to DA 1 602 that DA 2 604 has completed draining its pending I/Os from the PD. Once DA 2 604 has completed draining its I/Os to the PD, it transitions from the draining state 603b to the drained state 603c. When either of the DAs 602, 604 sees that there are no more pending I/Os to the PD whereby draining has been completed by both DAs 602, 604 (e.g., after notifications 608 and 610 have been sent), that DA clears the pending NR state of the PD indicating that the PD can now be taken offline. For example, assume DA 1 602 observes that all pending I/Os to the PD have been drained after receiving notification 610, DA 1 602 may then clear the pending NR state and transition its state from 601c to 601a. Similarly, DA 2 604 may observe that the PD pending NR state has been cleared (e.g., such as by receiving the updated PD state information) and then transition its state from 603c to 603a.

During data storage system bootup where the data storage system is currently transition from the offline to online/active state, the PD may be initialized whereby the PD transitions from an offline/unavailable state to an online/active state. In at least one embodiment in accordance with techniques herein, a preferred DA may be designated for each PD. The preferred DA for each PD may be denoted, for example, in configuration information read in connection with booting or initializing the data storage system. In an embodiment in which the PD is included in a RAID group and multiple DAs service I/Os directed to the PD as described herein, the configuration information may also indicate a secondary DA owner for the PD. For example, if DA 1 102*a* is designated as the preferred owner of the PD, then DA 2 102*b* is designated as the secondary DA owner of the PD. During system bootup, the designated preferred DA for each PD may initiate processing to bring the PD online for use in the data storage system. In connection with this case, the preferred DA for the PD does not need to acquire the exclusive ownership PD level lock (e.g. no contention with other DA since only preferred DA will initiate processing for the PD coming online/active). Once the PD comes online and is ready for use, the preferred DA may perform any needed processing, such as update PD state information, notify the other secondary DA owner regarding the PD online status, and the like. In connection with booting up the system, there is no need to perform synchronous I/O draining (e.g., FIG. 9) since the system is currently in an offline state where no I/Os are being serviced. In the event that the preferred DA for a PD as noted above is not active/online, then the secondary DA for the PD may takeover/failover and become the new preferred DA for the PD and perform any needed processing during the booting process to bring the PD online for use.

When the data storage system is online and actively servicing I/Os, it may necessary to bring the PD online such as in connection with PD spin up where the PD transitions from an offline state to an online state. In connection with spinning up a PD to bring it online for use in a data storage system that is actively servicing I/Os, one of the multiple DAs (e.g., servicing I/Os to the PD) acquires the PD level lock with exclusive access and then initiates the sPD pin up processing to bring the PD online/ready. Once online, the PD level lock may be released by the DA and then the DA that held the PD level lock may notify other DA of the ready/ online state change of the PD.

When the data storage system is online and actively servicing I/Os, it may be necessary to bring the PD offline such as described, for example, in connection with FIG. 9. In this case, the PD transitions from an online/ready state to an NR state as discussed above in connection with FIG. 9. Transitioning the PD to the NR state (e.g., offline) may be performed as a result, for example, of PD errors where, as discussed above and in connection with FIG. 9, one of the DAs detects the PD error state and may initiate the processing to take the PD offline (into the NR state). Prior to commencing such processing, the initiating DA may first acquire exclusive access to the PD level lock for the PD. Once the I/Os to the PD have been drained (e.g., such as in FIG. 9), the PD state information may be updated to denote the NR state (e.g., offline, unavailable) and the DA may release the PD level lock for the PD.

Described above are techniques that may be used to determine an optimized distribution of LDEVs among backend DAs which service I/s directed to the LDEVs. The partitioning may be performed to designate one of the DAs as primary or active for each of the LDEVs (e.g., FIGS. 4, 5, 6). The LDEVs may have physical storage provisioned from a RAID group of PDs which are serviced by the DAs and the DAs may concurrently perform I/O to each of the PDs of the RAID group (e.g. FIG. 3). Such techniques may be used to determine an initial distribution of the LDEVs among the DAs where the distribution is balanced. The initial distribution may be performed using distribution technique that partitions the LDEVs among the possible set of primary DAs in accordance with one or more balancing criteria (e.g., FIGS. 4, 5, 6). In response to configuration changes, or more generally an occurrence of a defined trigger condition, rebalancing may be performed as needed in accordance with the configuration change (e.g., FIG. 7). In connection with a configuration change and such rebalancing of the LDEVs among the primary DAs, the particular one of the DAs designated as the active, primary DA (e.g., owner) for one or more LDEVs may change. Techniques described herein provide for handling such ownership changes for an LDEV among the DAs in a seamless manner without disrupting I/O processing from hosts or clients by draining the LDEV I/Os handled by an old primary DA or owner prior to transitioning ownership to a new primary DA (e.g., FIG. 8). Techniques herein allow multiple DAs to manage and send I/Os the same set of PDs of a RAID group concurrently and handle PD level operations using a PD level lock. Synchronous I/O draining among multiple directors (e.g., FIG. 9) may be used in connection with various PD level operations. Such techniques may be used in embodiments where multiple DAs may concurrently service I/Os directed to the same PD (e.g., FIG. 3).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing configuration comprising:
   determining an initial distribution of a plurality of logical devices among a plurality of disk adapters, wherein said determining the initial distribution includes assigning each of the plurality of logical devices a designated one of the plurality of disk adapters as a primary active disk adapter and assigning each of the plurality of logical devices another of the plurality of disk adapters as a secondary disk adapter, and wherein the primary active disk adapter of said each logical device is the only one of the plurality of disk adapters that services I/Os directed to said each logical device and wherein the secondary disk adapter for said each logical device does not actively service I/Os directed to said each logical device and wherein the secondary disk adapter assumes a role as the primary active disk adapter for said each logical device upon failure of the designated one of the plurality of disk adapters, wherein the plurality of logical devices have storage provisioned from a RAID group comprising a plurality of physical storage devices, wherein each of the plurality of physical storage devices is configured to be concurrently managed and serviced by the plurality of disk adapters, wherein at least a first disk adapter of the plurality of disk adapters and a second disk adapter of the plurality of disk adapters are concurrently issuing first I/Os to a same one of the plurality of physical storage devices, wherein the plurality of logical devices have a plurality of device types and wherein said determining the initial distribution includes distributing the plurality of logical devices among the plurality of disk adapters in accordance with the plurality of device types each denoting a different data layout indicating a format in which data is stored on a logical device of said each device type;
detecting a configuration change, wherein the configuration change includes adding a second plurality of logical devices of a new device type denoting a new data layout indicating a new format in which data is stored on a logical device of said new device type; and
responsive to detecting a configuration change, performing first processing comprising:
determining, in accordance with the configuration change, a redistribution of the plurality of logical devices among the plurality of disk adapters, wherein said determining the redistribution includes assigning each of the plurality of logical devices a particular designated one of the plurality of disk adapters as the primary active disk adapter that is the only one of the plurality of disk adapters servicing I/Os directed to said each logical device, wherein said determining the redistribution includes distributing the plurality of logical devices and the second plurality of logical devices among the plurality of disk adapters in accordance with the plurality of device types and the new device type.

2. The method of claim 1, wherein the configuration change includes adding a new logical device having its storage provisioned from the plurality of physical storage devices of the RAID group, and wherein the redistribution includes assigning one of the plurality of disk adapters as the primary active disk adapter servicing I/Os directed to the new logical device.

3. The method of claim 1, wherein the configuration change includes deleting one of the plurality of logical devices having its storage provisioned from the plurality of physical storage devices of the RAID group, and wherein the redistribution includes removing a current assignment of one of the plurality of disk adapters as the primary active disk adapter servicing I/Os directed to said one logical device.

4. The method of claim 1, wherein each of the plurality of logical devices has its physical storage provisioned from each of the plurality of physical storage devices of the RAID group.

5. The method of claim 1, wherein the initial distribution and the redistribution are performed using a distribution technique that partitions the plurality of logical devices among the plurality of disk adapters in accordance with one or more balancing criteria.

6. The method of claim 5, wherein the one or more balancing criteria include evenly distributing the plurality of logical devices among the plurality of disk adapters.

7. The method of claim 5, wherein the plurality of logical devices includes a first portion having a first compression rate or ratio and a second portion have a second compression rate or ratio and the one or more balancing criteria include evenly distributing the first portion of the plurality of logical devices having the first compression ratio among the plurality of disk adapters and evenly distributing the second portion of the plurality of logical device having the second compression ratio among the plurality of disk adapters.

8. The method of claim 5, wherein the plurality of logical devices includes a first portion having compression enabled and a second portion having compression disabled and the one or more balancing criteria include evenly distributing the first portion of the plurality of logical devices having compression enabled among the plurality of disk adapters and evenly distributing the second portion of the plurality of logical device having compression disabled among the plurality of disk adapters.

9. The method of claim 5, wherein the one or more balancing criteria include evenly distributing a first portion of the plurality of logical devices having a first device type among the plurality of disk adapters and evenly distributing a second portion of the plurality of logical devices having a second device type among the plurality of disk adapters.

10. The method of claim 5, wherein the plurality of logical devices includes a first portion having a first property or attribute and a second portion having a second property or attribute, wherein the second property or attribute is different from the first property or attribute, and the one or more balancing criteria include evenly distributing the first portion of the plurality of logical devices having the first property or attribute among the plurality of disk adapters and evenly distributing the second portion of the plurality of logical devices having the second property or attribute among the plurality of disk adapters.

11. The method of claim 1, wherein in the initial distribution, a first of the plurality of logical devices is assigned a third of the plurality of disk adapters as the primary active disk adapter that is the only one of the plurality of disk adapters servicing I/Os directed to said first logical device, and wherein the first processing includes:
assigning a fourth of the plurality of disk adapters as the primary active disk adapter that is the only one of the plurality of disk adapters servicing I/Os directed to said first logical device, wherein, after assigning the fourth disk adapter, the fourth disk adapter, rather than the third disk adapter, is the only one of the plurality of disk adapters that services I/Os directed to the first logical device.

12. The method of claim 11, wherein the first processing includes:
draining pending I/Os directed to the first logical device, wherein the pending I/Os are issued and managed by the third disk adapter; and
receiving one or more additional I/Os directed to the first logical device, wherein the one or more additional I/Os are issued and managed by the fourth disk adapter.

13. The method of claim 12, wherein during said draining, no new I/O operations directed to the first logical device are sent to the third disk adapter for servicing and all subsequently received I/Os directed to the first logical device are sent to the fourth disk adapter.

14. The method of claim 13, wherein at least a first of the pending I/Os managed by the third disk adapter and a second of the one or more additional I/Os are concurrent whereby the third disk adapter and the fourth disk adapter are concurrently accessing at least one of the plurality of physical storage devices of the RAID group to process the first I/O and the second I/O.

15. The method of claim 1, further comprising:
performing a first operation on a first of the physical storage devices of the RAID group requiring synchronous draining of I/Os directed to the first physical storage device.

16. The method of claim 15, wherein said synchronous draining includes draining pending I/Os from each of the plurality of directors directed to the first physical storage device.

17. A system comprising:
a processor; and a memory comprising code stored thereon that, when executed, performs a method of performing configuration comprising:
determining an initial distribution of a plurality of logical devices among a plurality of disk adapters, wherein said determining the initial distribution includes assigning each of the plurality of logical devices a designated one of the plurality of disk adapters as a primary active disk adapter and assigning each of the plurality of logical devices another of the plurality of disk adapters as a secondary disk adapter, and wherein the primary active disk adapter of said each logical device is the only one of the plurality of disk adapters that services I/Os directed to said each logical device and wherein the secondary disk adapter for said each logical device does not actively service I/Os directed to said each logical device and wherein the secondary disk adapter assumes a role as the primary active disk adapter for said each logical device upon failure of the designated one of the plurality of disk adapters, wherein the plurality of logical devices have storage provisioned from a RAID group comprising a plurality of physical storage devices, wherein each of the plurality of physical storage devices is configured to be concurrently managed and serviced by the plurality of disk adapters, wherein at least a first disk adapter of the plurality of disk adapters and a second disk adapter of the plurality of disk adapters are concurrently issuing first I/Os to a same one of the plurality of physical storage devices, wherein the plurality of logical devices have a plurality of device types and wherein said determining the initial distribution includes distributing the plurality of logical devices among the plurality of disk adapters in accordance with the plurality of device types each denoting a different data layout indicating a format in which data is stored on a logical device of said each device type;
detecting a configuration change, wherein the configuration change includes adding a second plurality of logical devices of a new device type denoting a new data layout indicating a new format in which data is stored on a logical device of said new device type; and
responsive to detecting a configuration change, performing first processing comprising:
determining, in accordance with the configuration change, a redistribution of the plurality of logical devices among the plurality of disk adapters, wherein said determining the redistribution includes assigning each of the plurality of logical devices a particular designated one of the plurality of disk adapters as the primary active disk adapter that is the only one of the plurality of disk adapters servicing I/Os directed to said each logical device, wherein said determining the redistribution includes distributing the plurality of logical devices and the second plurality of logical devices among the plurality of disk adapters in accordance with the plurality of device types and the new device type.

18. A non-transitory computer readable medium comprising code stored thereon that, when executed, performs method of performing configuration comprising:
determining an initial distribution of a plurality of logical devices among a plurality of disk adapters, wherein said determining the initial distribution includes assigning each of the plurality of logical devices a designated one of the plurality of disk adapters as a primary active disk adapter and assigning each of the plurality of logical devices another of the plurality of disk adapters as a secondary disk adapter, and wherein the primary active disk adapter of said each logical device is the only one of the plurality of disk adapters that services I/Os directed to said each logical device and wherein the secondary disk adapter for said each logical device does not actively service I/Os directed to said each logical device and wherein the secondary disk adapter assumes a role as the primary active disk adapter for said each logical device upon failure of the designated one of the plurality of disk adapters, wherein the plurality of logical devices have storage provisioned from a RAID group comprising a plurality of physical storage devices, wherein each of the plurality of physical storage devices is configured to be concurrently managed and serviced by the plurality of disk adapters, wherein at least a first disk adapter of the plurality of disk adapters and a second disk adapter of the plurality of disk adapters are concurrently issuing first I/Os to a same one of the plurality of physical storage devices, wherein the plurality of logical devices have a plurality of device types and wherein said determining the initial distribution includes distributing the plurality of logical devices among the plurality of disk adapters in accordance with the plurality of device types each denoting a different data layout indicating a format in which data is stored on a logical device of said each device type;
detecting a configuration change, wherein the configuration change includes adding a second plurality of logical devices of a new device type denoting a new data layout indicating a new format in which data is stored on a logical device of said new device type; and
responsive to detecting a configuration change, performing first processing comprising:
determining, in accordance with the configuration change, a redistribution of the plurality of logical devices among the plurality of disk adapters, wherein said determining the redistribution includes assigning each of the plurality of logical devices a particular designated one of the plurality of disk adapters as the primary active disk adapter that is the only one of the plurality of disk adapters servicing I/Os directed to said each logical device, wherein said determining the redistribution includes distributing the plurality of logical devices and the second plurality of logical devices among the plurality of disk adapters in accordance with the plurality of device types and the new device type.

19. The non-transitory computer readable medium of claim 18, wherein the configuration change includes adding a new logical device having its storage provisioned from the plurality of physical storage devices of the RAID group, and wherein the redistribution includes assigning one of the plurality of disk adapters as the primary active disk adapter servicing I/Os directed to the new logical device.

20. The non-transitory computer readable medium of claim 18, wherein the configuration change includes deleting one of the plurality of logical devices having its storage provisioned from the plurality of physical storage devices of the RAID group, and wherein the redistribution includes removing a current assignment of one of the plurality of disk adapters as the primary active disk adapter servicing I/Os directed to said one logical device.

21. The method of claim 1, wherein the first disk adapter is configured as the primary disk adapter for a first logical device, wherein the first logical device includes a first portion stored on the same one of the plurality of physical storage devices, the second disk adapter is configured as the primary disk adapter for a second logical device, wherein the second logical device includes a second portion stored on the same one of the plurality of physical storage devices, the second logical device is different from the first logical device, the first I/Os include a first I/O directed to the first portion of the first logical device and include a second I/O directed to the second portion of the second logical device, and the first disk adapter issues the first I/O to the first portion of the first logical device concurrently with the second disk adapter issuing the second I/O to the second portion of the second logical device.

22. The method of claim 1, wherein each of the plurality of disk adapters is a physical device controller configured to access the plurality of physical storage devices.

23. The method of claim 1, wherein the configuration change is a change in connection with at least one logical device having storage provisioned from the RAID group.

24. The method of claim 1, wherein each of the plurality of physical storage devices is a multi-port physical storage device including multiple ports and wherein each of the plurality of disk adapters is configured to concurrently communicate with each of the plurality of physical storage devices over a different one of the multiple ports of said each physical storage device.

25. The method of claim 1, wherein the plurality of device types include a fixed block architecture (FBA) device type and a count key data (CKD) device type, wherein a logical device of the CKD type includes records of varying sizes, and wherein a logical device of the FBA device type includes fixed size blocks.

* * * * *